United States Patent
Liu et al.

(10) Patent No.: US 11,233,735 B2
(45) Date of Patent: Jan. 25, 2022

(54) METHOD AND APPARATUS FOR MESSAGE TRANSMISSION

(71) Applicant: NEW H3C TECHNOLOGIES CO., LTD., Hangzhou (CN)

(72) Inventors: Yongkui Liu, Beijing (CN); Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 111 days.

(21) Appl. No.: 16/611,111

(22) PCT Filed: Apr. 8, 2018

(86) PCT No.: PCT/CN2018/082133
§ 371 (c)(1),
(2) Date: Nov. 5, 2019

(87) PCT Pub. No.: WO2018/214652
PCT Pub. Date: Nov. 29, 2018

(65) Prior Publication Data
US 2020/0059432 A1    Feb. 20, 2020

(30) Foreign Application Priority Data
May 24, 2017  (CN) .......................... 201710371743.3

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,750,122 B1 * 6/2014 Assarpour ........... H04L 12/4641
370/235
9,264,302 B2   2/2016 Ernstrom et al.
(Continued)

FOREIGN PATENT DOCUMENTS

| CN | 102843285 | 12/2012 |
| CN | 104092621 | 10/2014 |

(Continued)

OTHER PUBLICATIONS

Partial Supplementary European Search Report issued in corresponding European Application No. 18805365.6, dated Feb. 17, 2020.
(Continued)

*Primary Examiner* — Nishant Divecha
(74) *Attorney, Agent, or Firm* — Norton Rose Fulbright US LLP

(57) ABSTRACT

A packet transmission method and apparatus are disclosed. The method comprises: determining whether an opposite DR-member device is connected to a first type of device, where the first type of device is a device connected to the opposite DR-member device but not connected to the local DR-member device, wherein when required to send a packet of a specified type, the packet is sent to the opposite DR-member device if the opposite DR-member device is connected to the first type of device; and the packet is prohibited from being sent to the opposite DR-member device if the opposite DR-member device is not connected to the first type of device.

12 Claims, 4 Drawing Sheets

(51) Int. Cl.
*H04L 12/709* (2013.01)
*H04L 12/823* (2013.01)
*H04L 12/801* (2013.01)
*H04L 29/12* (2006.01)

(52) U.S. Cl.
CPC ............ *H04L 45/245* (2013.01); *H04L 47/10* (2013.01); *H04L 47/32* (2013.01); *H04L 61/6022* (2013.01)

(56) References Cited

U.S. PATENT DOCUMENTS

| | | | | |
|---|---|---|---|---|
| 2013/0246635 | A1* | 9/2013 | Gero | H04L 45/245 709/227 |
| 2014/0219081 | A1* | 8/2014 | Natarajan | H04L 41/0659 370/228 |
| 2014/0369186 | A1* | 12/2014 | Ernstrom | H04L 45/586 370/228 |
| 2015/0009861 | A1* | 1/2015 | Balazs | H04L 41/0816 370/254 |
| 2015/0188808 | A1* | 7/2015 | Ghanwani | H04L 45/16 709/244 |
| 2015/0271088 | A1* | 9/2015 | Ao | H04L 47/125 370/276 |
| 2015/0326309 | A1* | 11/2015 | Lanzone | H04B 10/27 398/2 |
| 2016/0006502 | A1* | 1/2016 | Fulignoli | H04J 3/14 398/2 |
| 2016/0105324 | A1* | 4/2016 | Ao | H04L 45/28 370/254 |
| 2016/0149759 | A1* | 5/2016 | Anumala | H04L 41/0663 370/254 |
| 2016/0212041 | A1* | 7/2016 | Krishnamurthy | H04L 12/4641 |
| 2016/0254960 | A1* | 9/2016 | Pai | H04L 41/12 370/254 |
| 2016/0261464 | A1* | 9/2016 | Kusumoto | H04L 45/245 |
| 2016/0301608 | A1* | 10/2016 | Natarajan | H04L 45/7453 |
| 2018/0004777 | A1* | 1/2018 | Bulkowski | G06F 16/27 |
| 2018/0159734 | A1* | 6/2018 | Farkas | H04L 41/0672 |
| 2019/0045367 | A1* | 2/2019 | Mueck | H04W 16/14 |

FOREIGN PATENT DOCUMENTS

| | | |
|---|---|---|
| CN | 106059886 | 10/2016 |
| CN | 106161248 | 11/2016 |
| JP | 2014155186 | 8/2014 |
| WO | WO 2013118873 | 8/2013 |
| WO | WO 2014056367 | 4/2014 |

OTHER PUBLICATIONS

Office Action issued in Corresponding Japanese Application No. 2019-564069, dated Nov. 10, 2020 (English Translation provided).
International Search Report and Written Opinion issued in International Application No. PCT/CN2018/082133, dated Jun. 29, 2018.
Office Action issued in Corresponding Japanese Application No. 2019-564069, dated Jun. 29, 2021 (English Translation provided).

* cited by examiner

METHOD AND APPARATUS FOR MESSAGE TRANSMISSION

CROSS-REFERENCE TO RELATED APPLICATIONS

This application is a national phase under 35 U.S.C. § 371 of International Application No. PCT/CN2018/082133, filed Apr. 8, 2018, which claims priority to Chinese Patent Application No. CN201710371743.3, filed with the China National Intellectual Property Administration on May 24, 2017 and entitled "Packet transmission Method and Apparatus", the entire contents of each of which are hereby incorporated by reference in their entirety.

TECHNICAL FIELD

The present disclosure relates to the field of communication technologies, and in particular to a packet transmission method and apparatus.

BACKGROUND

Link aggregation means that multiple physical ports are bundled together to form a logical port, so as to implement the traffic load sharing among the individual physical ports. When one of the physical ports fails, traffic can also be transmitted through other physical ports to achieve link redundancy and ensure reliability. Currently, not only multiple physical ports of one network device can be bundled together, but also multiple physical ports of different network devices can be bundled together.

SUMMARY

In a first aspect, an embodiment of the present disclosure provides a packet transmission method applied to a local (local-terminal) DR-member device for distributed resilient network interconnect (DR), the method comprising:

determining whether an opposite (opposite-terminal) DR-member device is connected to a first type of device, where the first type of device is a device connected to the opposite DR-member device but not connected to the local DR-member device, wherein when required to send a packet of a specified type, if the opposite DR-member device is connected to the first type of device, the packet is sent to the opposite DR-member device; and if the opposite DR-member device is not connected to the first type of device, the packet is prohibited from being sent to the opposite DR-member device.

In a second aspect, an embodiment of the present disclosure provides a packet transmission method applied to a non-DR-member device for the distributed resilient network interconnect, the method comprising:

receiving a detection message sent by a DR-member device connected to the non-DR-member device, where the detection message carries a system MAC address and a bridge MAC address of the DR-member device, and recording a correspondence relationship between the system MAC address and the bridge MAC address in a mapping table; and judging whether a system MAC address and a bridge MAC address of another DR-member device are present in the mapping table, wherein if the system MAC address and the bridge MAC address of the another DR-member device are present in the mapping table, a response message carrying the system MAC address and the bridge MAC address of the another DR-member device is returned to the DR-member device, so that the DR-member device determines according to the response message that the non-DR-member device is not a device of a specified type; and if the system MAC address and the bridge MAC address of the another DR-member device are not present in the mapping table, a response message carrying an MAC address of the non-DR-member device is returned to the DR-member device, so that the DR-member device determines according to the response message that the non-DR-member device is a device of a specified type.

In a third aspect, an embodiment of the present disclosure provides a packet transmission apparatus applied to a local DR-member device for the distributed resilient network interconnect, the packet transmission apparatus comprising:

a determination module configured to determine whether an opposite DR-member device is connected to a first type of device, where the first type of device is a device connected to the opposite DR-member device but not connected to the local DR-member device; and a processing module configured to send, when required to send a packet of a specified type, the packet to the opposite DR-member device if the opposite DR-member device is connected to the first type of device, and to prohibit sending the packet to the opposite DR-member device if the opposite DR-member device is not connected to the first type of device.

In a fourth aspect, an embodiment of the present disclosure provides a packet transmission apparatus applied to a non-DR-member device for the distributed resilient network interconnect, the packet transmission apparatus comprising:

a receiving module configured to receive a detection message sent by a DR-member device connected to the non-DR-member device, with the detection message carrying a system MAC address and a bridge MAC address of the DR-member device, and to record a correspondence relationship between the system MAC address and the bridge MAC address in a mapping table;

a judgment module configured to judge whether a system MAC address and a bridge MAC address of another DR-member device are present in the mapping table, wherein the system MAC address of the another DR-member device is the same as the system MAC address of the DR-member device, and the bridge MAC address of the another DR-member device is different from the bridge MAC address of the DR-member device; and a sending module configured to return to the DR-member device a response message carrying the system MAC address and the bridge MAC address of the another DR-member device when the system MAC address and the bridge MAC address of the another DR-member device are present in the mapping table, so that the DR-member device determines according to the response message that the non-DR-member device is not a device of a specified type; and to return a response message carrying an MAC address of the non-DR-member device to the DR-member device when the system MAC address and the bridge MAC address of the another DR-member device are not present in the mapping table, so that the DR-member device determines according to the response message that the non-DR-member device is a device of a specified type.

In a fifth aspect, an embodiment of the present disclosure provides a local DR-member device, comprising:

a machine-readable storage medium and a processor, wherein the machine-readable storage medium is adapted to store instruction codes; and the processor is in communication with the machine-readable storage medium, and adapted to read and execute the instruction codes stored in the machine-readable storage medium, to implement the aforesaid packet transmission method executed by the local DR-member device.

In a sixth aspect, an embodiment of the present disclosure provides a non-DR-member device, comprising:

a machine-readable storage medium and a processor, wherein the machine-readable storage medium is adapted to store instruction codes; and the processor is in communication with the machine-readable storage medium, and adapted to read and execute the instruction codes stored in the machine-readable storage medium, to implement the aforesaid packet transmission method executed by the non-DR-member device.

In a seventh aspect, an embodiment of the present disclosure provides a computer-readable storage medium, the computer-readable storage medium comprising computer programs, wherein during operation of the computer programs, a local DR-member device, at which the computer-readable storage medium is positioned, is controlled to execute the packet transmission method described above when the computer program is running.

Based on the technical solutions described above, in the embodiments of the present disclosure, when a local DR-member device is required to send a packet of a specified type, such as a broadcast packet or an unknown unicast packet, the packet is sent to an opposite DR-member device if the opposite DR-member device is connected to a first type of device, and the packet is prohibited from being sent to the opposite DR-member device if the opposite DR-member device is not connected to the first type of device. In this way, only when the opposite DR-member device is to forward the packet, the packet will be sent to the opposite DR-member device through an IPL, thereby avoiding the invalid transmission of the packet, saving IPL resources, reducing the burden on the IPL, and improving the stability of the IPL.

BRIEF DESCRIPTION OF DRAWINGS

For illustrating technical solutions of embodiments of the present disclosure or of the prior art more clearly, drawings required for use in the description of the embodiments of the present disclosure or of the prior art will be introduced briefly below. It is apparent that the drawings in the following description are merely illustrative of some embodiments of the present disclosure. It would be understood by those of ordinary skill in the art that other drawings could also be obtained from these drawings of the embodiments of the present disclosure.

DETAILED DESCRIPTION

The terminology used in the present disclosure is for the purpose of describing particular embodiments only and is not intended to limit the present disclosure. The singular forms "a/an", "said", and "the" as used in the present disclosure and in the claims are intended to include the plural forms as well, unless the context clearly indicates otherwise. It should also be understood that the term "and/or" as used herein refers to and encompasses any or all possible combinations of one or more of the associated listed items.

It should be understood that although the terms such as "first", "second", and "third" may be used in the present disclosure to describe various information, such information should not be limited to these terms. These terms are only used to distinguish the same type of information from one another. For example, first information may also be referred to as second information without departing from the scope of the present disclosure, and similarly, the second information may also be referred to as the first information. In addition, the word "if" used may be interpreted as "at the time of . . . " or "when . . . " or "in response to the determination", depending on the context.

Figure 1:
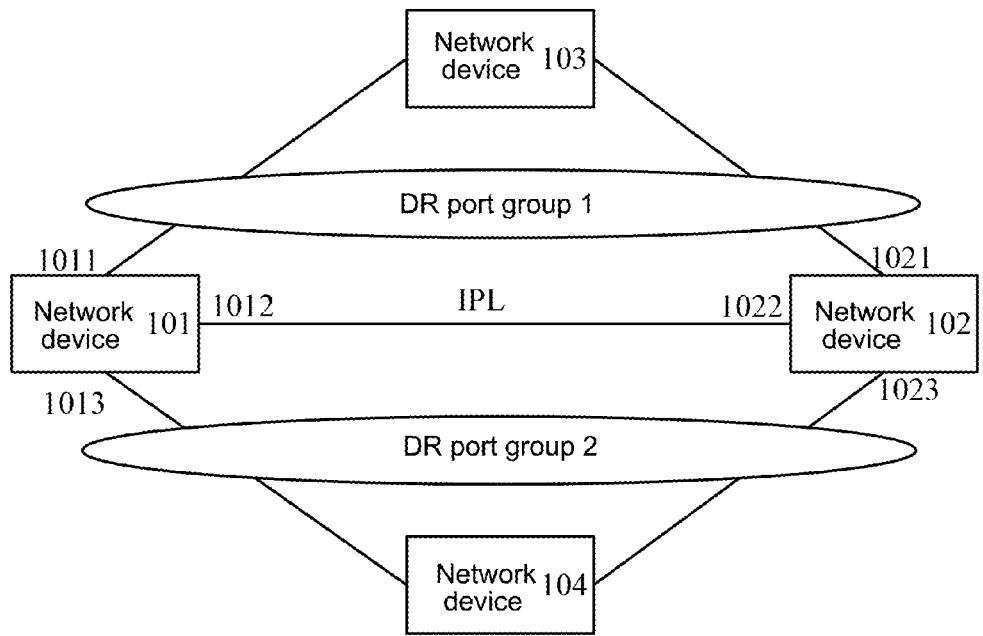
FIG. 1 is a schematic diagram showing the networking for the distributed resilient network interconnect.

As an exemplary implementation for implementing link aggregation, in a scenario shown in FIG. 1, a port 1011 of a network device 101 and a port 1021 of a network device 102 may be bundled together, and a port 1013 of the network device 101 and a port 1023 of the network device 102 may be bundled together to implement port aggregation across network devices. Such port aggregation is also referred to as the DR (Distributed Resilient network interconnect). Here, the network device 101 and the network device 102 may be referred to as DR-member devices, and the ports aggregated together may constitute a DR port group. Each port in the DR port group may be referred to as a DR-member port. For example, the DR-member ports in DR port group 1 may include the port 1011 and the port 1021, and the DR-member ports in DR port group 2 may include the port 1013 and the port 1023.

Under the architecture shown in FIG. 1, when the network device 103 sends a packet 1, the packet 1 is sent to the network device 101 or the network device 102. A case where the packet is sent to the network device 102 is taken as an example. After the network device 102 receives the packet 1, if the packet 1 is a broadcast packet, the packet 1 is sent through the port 1022 and the port 1023. After the network device 101 receives the packet 1 through the port 1012, since the port 1011 and the port 1021 are in the same DR port group 1 and the packet 1 is received by the port 1021, the packet 1 is no longer sent through the port 1011. Since the port 1013 and the port 1023 are in the same DR port group 2 and the packet 1 has been sent through the port 1023, the packet 1 is no longer sent through the port 1013. In summary, the network device 101 no longer forwards the packet 1.

In the way described above, the broadcast packet sent from the network device 102 to the network device 101 is directly discarded by the network device 101, and the network device 101 does not forward the broadcast packet. The invalid transmission of the broadcast packet occupies IPL (Intra Portal Link) resources and increases the burden on the IPL.

All the shortcomings existing in the above scheme are obtained resulting from practice and careful study by the inventor. Therefore, both the process of discovering the above problems and the solutions to solve the above problems proposed in the embodiments of the present disclosure hereinafter should be the inventor's contributions to the invention during the invention process.

In view of this, a packet transmission method is proposed in an embodiment of the present disclosure. The method may be applied to a system comprising a local DR-member device, an opposite DR-member device, and a non-DR-member device, and the local DR-member device and the opposite DR-member device are opposite to each other. For example, assuming that the ports of the network device 1 and the ports of the network device 2 are bundled together to form port aggregation across network devices, the network device 1 and the network device 2 may be referred to as DR-member devices. Moreover, if the network device 1 is a local DR-member device, the network device 2 is an opposite DR-member device; and if the network device 1 is an opposite DR-member device, the network device 2 is a local DR-member device. In addition, devices other than the DR-member devices can be referred to as non-DR-member devices.

In the present disclosure, the local DR-member device refers to a local member device for the distributed resilient network interconnect, and the opposite DR-member device refers to an opposite member device for the distributed resilient network interconnect.

Figure 2:
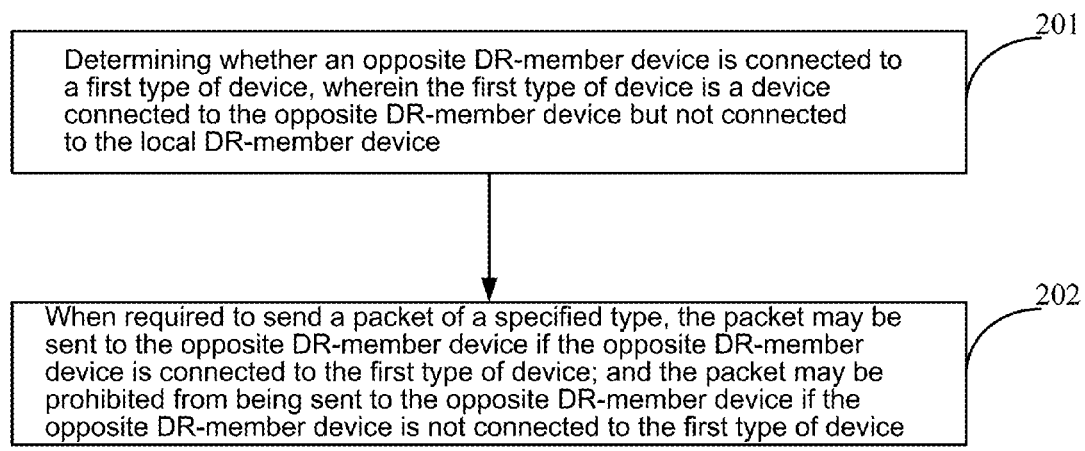
FIG. 2 is a flowchart of a packet transmission method in an embodiment of the present disclosure.

Based on the application scenario described above, referring to FIG. 2 which shows a schematic flowchart of the packet transmission method, the method may be applied to a local DR-member device, and the method may comprise operations as shown in FIG. 2.

In block 201, it is determined whether an opposite DR-member device is connected to a first type of device, wherein the first type of device is a device connected to the opposite DR-member device but not connected to the local DR-member device.

In one example, the process of "determining, by the local DR-member device, whether the opposite DR-member device is connected to a first type of device" may include, but not limited to, the following modes:

In a first mode, the local DR-member device receives a first message sent by the opposite DR-member device, with the first message carrying address information corresponding to a non-DR-member port of the opposite DR-member device in a forwarding table, and queries, from a local forwarding table, address information corresponding to a non-DR-member port of the local DR-member device. Then, if the queried address information does not include the address information carried by the first message, the local DR-member device can determine that the opposite DR-member device is connected to the first type of device; and if the queried address information has included the address information carried by the first message, it can be determined that the opposite DR-member device is not connected to the first type of device.

Here, one or more pieces of address information corresponding to the non-DR-member port of the opposite DR-member device in the forwarding table may be carried in the first message, and one or more pieces of address information corresponding to the non-DR-member port of the local DR-member device may be queried from the local forwarding table. When there are multiple pieces of address information carried in the first message, the local DR-member device can determine that the opposite DR-member device is connected to the first type of device if the queried address information does not include any one piece of the address information carried by the first message; and can determine that the opposite DR-member device is not connected to the first type of device if the queried address information has included all the address information carried by the first message.

In the second mode, the local DR-member device receives a second message sent by the opposite DR-member device. The second message carries connection information, and the connection information is used to indicate that the opposite DR-member device is connected to the first type of device or is not connected to the first type of device. Then, the local DR-member device determines according to the second message whether the opposite DR-member device is connected to the first type of device. Here, before the local DR-member device receives the second message sent by the opposite DR-member device, the opposite DR-member device may first determine whether the opposite DR-member device is connected to the first type of device; and then, the opposite DR-member device sends the second message to the local DR-member device.

The process of "determining, by the opposite DR-member device, whether the opposite DR-member device is connected to the first type of device" may include: sending, by the opposite DR-member device, a detection message to a non-DR-member device connected to the opposite DR-member device, where the detection message carries a system MAC (Media Access Control) address and a bridge MAC address of the opposite DR-member device, so that the non-DR-member device records the system MAC address and the bridge MAC address in a mapping table. Then, the opposite DR-member device receives a response message which the non-DR-member device returns as to the detection message, wherein a system MAC address and a bridge MAC address of the local DR-member device are carried in the response message if the system MAC address and the bridge MAC address of the local DR-member device are recorded in the mapping table; and an MAC address of the non-DR-member device is carried in the response message if the system MAC address and the bridge MAC address of the local DR-member device are not recorded in the mapping table. Then, if the opposite DR-member device parses out the system MAC address and the bridge MAC address of the local DR-member device from the response message, it is determined that the non-DR-member device is not the first type of device for the opposite DR-member device; and if the opposite DR-member device parses out the MAC address of the non-DR-member device from the response message, it is determined that the non-DR-member device is the first type of device for the opposite DR-member device.

In practical applications, the local DR-member device may also determine whether the local DR-member device is connected to a second type of device. The second type of device refers to a device connected to the local DR-member device but not connected to the opposite DR-member device. Then, a third message may be sent to the opposite DR-member device. The third message may also carry connection information, and the connection information is used to indicate that the local DR-member device is connected to the second type of device or is not connected to the second type of device, so that the opposite DR-member device determines according to the third message whether the local DR-member device is connected to the second type of device.

The process of "determining, by the local DR-member device, whether the local DR-member device is connected to the second type of device" may include: sending, by the local DR-member device, a detection message to a non-DR-member device connected to the local DR-member device, where the detection message carries a system MAC address and a bridge MAC address of the local DR-member device, so that the non-DR-member device records the system MAC address and the bridge MAC address in a mapping table. The local DR-member device receives a response message which the non-DR-member device returns as to the detection message, wherein a system MAC address and a bridge MAC address of the opposite DR-member device are carried in the response message if the system MAC address and the bridge MAC address of the opposite DR-member device are recorded in the mapping table; and an MAC address of the non-DR-member device is carried in the response message if the system MAC address and the bridge MAC address of the opposite DR-member device are not recorded in the mapping table. If the local DR-member device parses out the system MAC address and the bridge MAC address of the opposite DR-member device from the response message, it is determined that the non-DR-member device is not the second type of device for the local DR-member device; and if the MAC address of the non-DR-member device is parsed out from the response message, it is determined that the non-DR-member device is the second type of device for the local DR-member device.

For the second mode described above, the processing process performed by the non-DR-member device includes: receiving a detection message sent by a DR-member device, such as a local DR-member device or an opposite DR-member device, connected to the non-DR-member device, where the detection message carries a system MAC address and a bridge MAC address of the DR-member device, and recording a correspondence relationship between the system MAC address and the bridge MAC address in a mapping table. Then, the non-DR-member device may judge whether a system MAC address and a bridge MAC address of another DR-member device are present in the mapping table, where the another DR-member device is the opposite DR-member device if the DR-member device is the local DR-member device; or the another DR-member device is the local DR-member device if the DR-member device is the opposite DR-member device. If the system MAC address and the bridge MAC address of the another DR-member device are present in the mapping table, a response message carrying the system MAC address and the bridge MAC address of the another DR-member device is returned to the DR-member device that has sent the detection message, so that the DR-member device can determine according to the response message that the non-DR-member device is not a device of a specified type for the DR-member device; and if the system MAC address and the bridge MAC address of the another DR-member device are not present in the mapping table, a response message carrying an MAC address of the non-DR-member device is returned to the DR-member device that has sent the detection message, so that the DR-member device determines according to the response message that the non-DR-member device is a device of a specified type for the DR-member device.

Here, the device of a specified type may be the first type of device or second type of device described above. Specifically, if the DR-member device is a local DR-member device, the device of a specified type may be the first type of device, and if the DR-member device is an opposite DR-member device, the device of a specified type may be the second type of device.

In one example, the system MAC address of the another DR-member device may be the same as the system MAC address of the DR-member device, and the bridge MAC address of the another DR-member device may be different from the bridge MAC address of the DR-member device. Therefore, after the system MAC address and the bridge MAC address of the DR-member device are obtained, if there is a table entry in the mapping table and the table entry has a system MAC address the same as the system MAC address of the DR-member device but has a bridge MAC address different from the bridge MAC address of the DR-member device, it is determined that the system MAC address and the bridge MAC address of the another DR-member device are present in the mapping table; otherwise, it is determined that the system MAC address and the bridge MAC address of the another DR-member device are not present in the mapping table.

In block 202, when required to send a packet of a specified type, such as a broadcast packet, or an unknown unicast packet, or a multicast packet or the like, the packet may be sent to the opposite DR-member device, for example through an IPL, if the opposite DR-member device is connected to the first type of device; and the packet may be prohibited from being sent to the opposite DR-member device if the opposite DR-member device is not connected to the first type of device.

Based on the technical solution described above, in the embodiment of the present disclosure, when a local DR-member device is required to send a packet of a specified type, such as a broadcast packet or an unknown unicast packet, the packet is sent to an opposite DR-member device if the opposite DR-member device is connected to the first type of device, and the packet is prohibited from being sent to the opposite DR-member device if the opposite DR-member device is not connected to the first type of device. In this way, only when the opposite DR-member device is to forward the packet, the packet will be sent to the opposite DR-member device through an IPL, thereby avoiding the invalid transmission of the packet, saving IPL resources, reducing the burden on the IPL, and improving the stability of the IPL.

Figure 3:
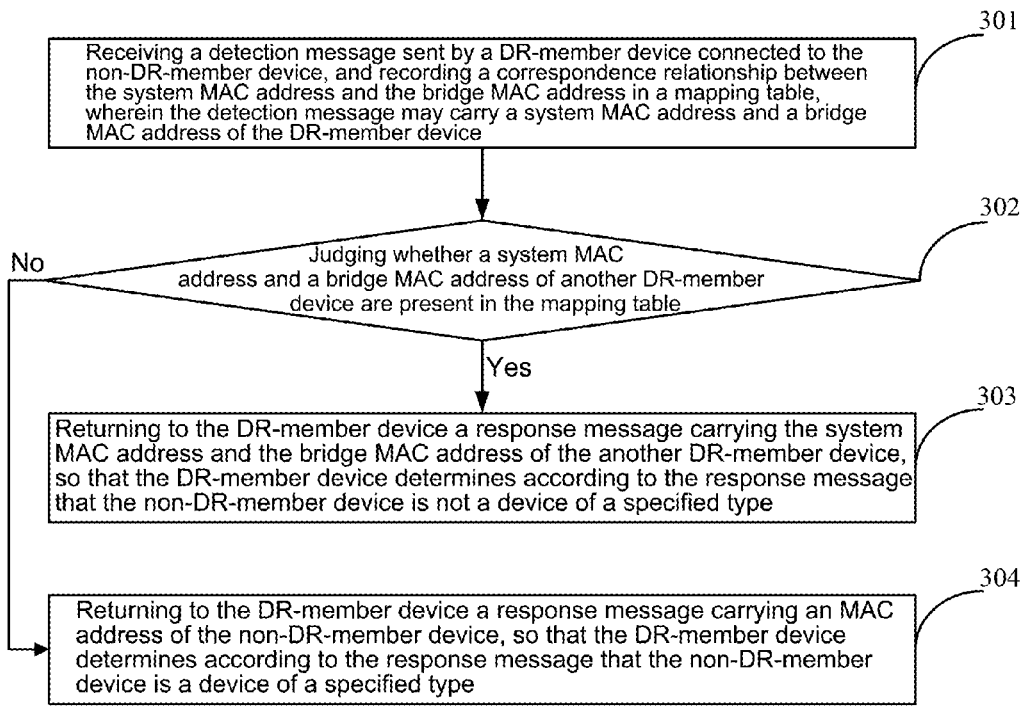
FIG. 3 is a flowchart of a packet transmission method in another embodiment of the present disclosure.

Based on the same concept as the method described above, referring to FIG. 3 which shows another schematic flowchart of the packet transmission method, the method may be applied to a non-DR-member device, and the method may comprise operations as shown in FIG. 3.

In block 301, a detection message sent by a DR-member device connected to the non-DR-member device is received, wherein the detection message may carry a system MAC address and a bridge MAC address of the DR-member device; and a correspondence relationship between the system MAC address and the bridge MAC address is recorded in a mapping table.

In block 302, it is judged whether a system MAC address and a bridge MAC address of another DR-member device (the another DR-member device is an opposite DR-member device if the DR-member device is a local DR-member device; or the another DR-member device is the local DR-member device if the DR-member device is the opposite DR-member device) are present in the mapping table, wherein if the system MAC address and the bridge MAC address of the another DR-member device are present in the mapping table, the flow proceeds to block 303; and if the system MAC address and the bridge MAC address of the another DR-member device are not present in the mapping table, the flow proceeds to block 304.

In one example, the system MAC address of the another DR-member device may be the same as the system MAC address of the DR-member device, and the bridge MAC address of the another DR-member device may be different from the bridge MAC address of the DR-member device. Therefore, after the system MAC address and the bridge MAC address of the DR-member device are obtained, if there is a table entry in the mapping table and the table entry has a system MAC address the same as the system MAC address of the DR-member device but has a bridge MAC address different from the bridge MAC address of the DR-member device, it is determined that the system MAC address and the bridge MAC address of the another DR-member device are present in the mapping table; otherwise, it is determined that the system MAC address and the bridge MAC address of the another DR-member device are not present in the mapping table.

In block 303, a response message carrying the system MAC address and the bridge MAC address of the another DR-member device is returned to the DR-member device, so that the DR-member device determines according to the response message that the non-DR-member device is not a device of a specified type.

In block 304, a response message carrying an MAC address of the non-DR-member device is returned to the DR-member device, so that the DR-member device determines according to the response message that the non-DR-member device is a device of a specified type.

The technical solutions described above will be further described below in connection with an application scenario shown in FIG. 4.

Figure 4:
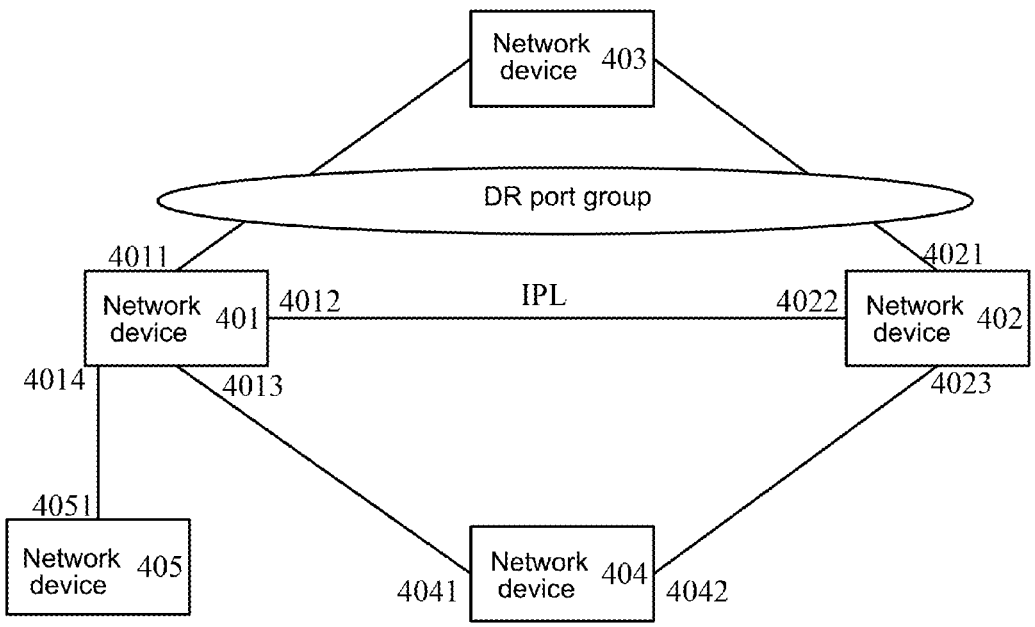
FIG. 4 is a schematic diagram of an application scenario in an embodiment of the present disclosure.

In FIG. 4, a port 4011 of a network device 401 and a port 4021 of a network device 402 may be bundled together, so as to implement port aggregation across network devices. On this basis, the network device 401 is a local DR-member device, and the network device 402 is an opposite DR-member device, alternatively, the network device 401 is an opposite DR-member device, and the network device 402 is a local DR-member device. In addition, the port 4011 and the port 4021 are DR-member ports. In addition, a network device 403, a network device 404, and a network device 405 are non-DR-member devices. In addition, a port 4013, a port 4014, and a port 4023 are non-DR-member ports.

In one example, based on the application scenario described above, a process of determining, by a local DR-member device, whether an opposite DR-member device is connected to a device of a specified type (i.e., a first type of device or a second type of device, each of which is referred to as a device of a specified type in the following description) may include, but not limited to, the following modes.

In the first mode, a forwarding table (such as an MAC table) maintained by the network device 401 is as shown in Table 1, and a forwarding table maintained by the network device 402 is as shown in Table 2. A process of generation of the forwarding table is not limited, for example, the forwarding table is generated by means of MAC learning or ARP (Address Resolution Protocol) learning or the like. In Table 1 and Table 2, MAC address 405 is the MAC address of the network device 405, MAC address 404 is the MAC address of the network device 404, and MAC address 403 is the MAC address of the network device 403.

TABLE 1

| MAC Address | Outbound Interface |
| --- | --- |
| MAC Address 404 | Interface 4013 |
| MAC Address 405 | Interface 4014 |
| MAC Address 403 | Interface 4011 |

TABLE 2

| MAC Address | Outbound Interface |
| --- | --- |
| MAC Address 404 | Interface 4023 |
| MAC Address 403 | Interface 4021 |

The network device 401 queries, from Table 1, address information (e.g., the MAC address) corresponding to each of the non-DR-member ports (e.g., the port 4013 and the port 4014), e.g. the MAC address 405 and the MAC address 404, and sends a message carrying the MAC address 405 and the MAC address 404 to the network device 402. After receiving the message, the network device 402 queries, from Table 2, the MAC address corresponding to each non-DR-member port (e.g., the port 4023), e.g., the MAC address 404. Since the queried MAC address 404 does not include every MAC addresses carried in the message, the network device 402 determines that the network device 401 is connected to a device of a specified type.

The network device 402 queries, from Table 2, the MAC address corresponding to each non-DR-member port (e.g., the port 4023), e.g., the MAC address 404, and sends a message carrying the MAC address 404 to the network device 401. After receiving the message, the network device 401 queries, from Table 1, the MAC address corresponding to each of the non-DR-member ports (e.g., the port 4013 and the port 4014), e.g., the MAC address 405 and the MAC address 404. On this basis, the network device 401 can determine that the network device 402 is not connected to a device of a specified type, since the MAC address 405 and the MAC address 404 include every MAC addresses carried in the message.

In the second mode, the network device 401 periodically sends a detection message to each of the non-DR-member devices (the network device 403, the network device 404, and the network device 405), or sends a detection message to the non-DR-member device (the network device 404 and the network device 405) through each non-DR-member port, both of which are implemented in the same manner. A case where a detection message 1 is sent to the network device 404 and the network device 405 is taken as an example in the following description. In the detection message 1, the system MAC address and the bridge MAC address of the network device 401 are carried. Similarly, the network device 402 periodically sends a detection message to each of the non-DR-member devices (the network device 403 and the network device 404), or sends a detection message to the non-DR-member device (the network device 404) through each non-DR-member port, both of which are implemented in the same manner. A case where a detection message 2 is sent to the network device 404 is taken as an example in the following description. In the detection message 2, the system MAC address and the bridge MAC address of the network device 402 are carried.

In one example, when the network device 401 and the network device 402 constitute a DR system, the same system MAC address, e.g., MAC address A, may be configured for the network device 401 and the network device 402, and a bridge MAC address, e.g., MAC address 401, is configured for the network device 401, and a bridge MAC address, e.g., MAC address 402, is configured for the network device 402. On this basis, the above detection message 1 carries the MAC address A and the MAC address 401, and the above detection message 2 carries the MAC address A and the MAC address 402.

In one example, the detection message 1 and the detection message 2 described above may be LLDP (Link Layer Discovery Protocol) messages, and the detection message 1 and the detection message 2 may carry an extended TLV (Type Length Value), and the extended TLV is used to carry the system MAC address and the bridge MAC address.

After receiving the detection message 1, the network device 405 parses out the MAC address A and the MAC address 401 from the detection message 1, and queries whether there is a matching table entry in the mapping table. When the network device 405 receives the detection message 1 for the first time, the mapping table is empty, and there is no matching table entry. Therefore, the correspondence relationship between the MAC address A and the MAC address 401 is recorded in the mapping table, as shown in Table 3. Then, the network device 405 judges whether a table entry, in which a system MAC address is the MAC address A and a bridge MAC address is not the MAC address 401, is present in the mapping table. Since the table entry is not present, a response message carrying the MAC address 405 of the network device 405 is returned to the network device 401. In addition, when it is not the first time that the network device 405 receives the detection message 1, the mapping table is as shown in Table 3, that is, there is a matching table entry. In this case, the network device directly judges whether a table entry, in which a system MAC address is the MAC address A and a bridge MAC address is not the MAC address 401, is present in the mapping table. Since the table entry is not present, a response message carrying the MAC address 405 of the network device 405 is returned to the network device 401.

TABLE 3

| System MAC Address | Bridge MAC Address |
| --- | --- |
| MAC Address A | MAC Address 401 |

In a practical application, when the network device 405 is generating the mapping table shown in Table 3, an inbound interface for the detection message 1 may also be recorded in the mapping table as shown in Table 4. The content of this table entry is not limited.

TABLE 4

| System MAC Address | Bridge MAC Address | Inbound Interface |
| --- | --- | --- |
| MAC Address A | MAC Address 401 | Interface 4051 |

After receiving a response message as to the detection message 1, the network device 401 may parse out the MAC address 405 of the network device 405 from the response message. Since the carried MAC address is not the MAC address of another DR-member device, it is determined that the network device 405 is a device of a specified type for the network device 401.

Then, the network device 401 may send a specified message (such as an LLDP message or the like) to the network device 402, where the specified message carries information indicating that the network device 401 is connected with a device of a specified type. On this basis, after receiving the specified message, the network device 402 may know that the network device 401 is connected with a device of a specified type.

In one example, the information indicating that the network device 401 is connected with a device of a specified type may include a preset numerical value and the MAC address 405, wherein the preset numerical value (e.g., 0; the following description is made by taking 0 as an example) indicates that the network device 401 is connected with a device of a specified type, and the MAC address 405 indicates an MAC address of the device of a specified type to which the network device 401 is connected. Moreover, after receiving the specified message, the network device 402 may maintain a mapping table shown in Table 5. The opposite terminal (network device 401) of the interface 4022 is connected with a device of a specified type.

TABLE 5

| System MAC Address | Bridge MAC Address | Inbound Interface |
| --- | --- | --- |
| 0 | MAC Address 405 | Interface 4022 |

The process described above is a process performed when the network device 405 receives the detection message 1. When the network device 404 receives the detection message 1 and the detection message 2, the process may be shown as follows.

In a first case, it is assumed that the detection message 1 is received first, and the detection message 2 is received thereafter.

After receiving the detection message 1, the network device 404 parses out the MAC address A and the MAC address 401 from the detection message 1, and queries whether there is a matching table entry in the mapping table. When the network device 404 receives the detection message 1 for the first time, the mapping table is empty, and there is no matching table entry. Therefore, the correspondence relationship between the MAC address A and the MAC address 401 is recorded in the mapping table, as shown in Table 6. Then, the network device 404 judges whether a table entry, in which a system MAC address is the MAC address A and a bridge MAC address is not the MAC address 401, is present in the mapping table. Since the table entry is not present, a response message carrying the MAC address 404 of the network device 404 is returned to the network device 401. In addition, when it is not the first time that the network device 404 receives the detection message 1, the mapping table is as shown in Table 6, that is, there is a matching table entry in the mapping table. In this case, it is directly judged whether a table entry, in which a system MAC address is the MAC address A and a bridge MAC address is not the MAC address 401, is present in the mapping table. Since the table entry is not present, a response message carrying the MAC address 404 of the network device 404 is returned to the network device 401.

TABLE 6

| System MAC Address | Bridge MAC Address | Inbound Interface |
| --- | --- | --- |
| MAC Address A | MAC Address 401 | Interface 4041 |

After receiving the detection message 2, the network device 404 parses out the MAC address A and the MAC address 402 from the detection message 2, and queries whether there is a matching table entry in the mapping table. When the network device 404 receives the detection message 2 for the first time, there is no matching table entry. Therefore, the correspondence relationship between the MAC address A and the MAC address 402 is recorded in the mapping table, as shown in Table 7. It is judged whether a table entry, in which a system MAC address is the MAC address A and a bridge MAC address is not the MAC address 402, is present in the mapping table. Since the MAC address A and the MAC address 401 are present, a response message carrying the MAC address A and the MAC address 401 is returned to the network device 402. When it is not the first time that the network device 404 receives the detection message 2, the mapping table is as shown in Table 7, that is, there is a matching table entry. It is judged whether a table entry, in which a system MAC address is the MAC address A and a bridge MAC address is not the MAC address 402, is present in the mapping table. Since the MAC address A and the MAC address 401 are present, a response message carrying the MAC address A and the MAC address 401 is returned to the network device 402.

TABLE 7

| System MAC Address | Bridge MAC Address | Inbound Interface |
|---|---|---|
| MAC Address A | MAC Address 401 | Interface 4041 |
| MAC Address A | MAC Address 402 | Interface 4042 |

Further, after the network device 404 maintains the mapping table shown in Table 7, upon the network device 404 receives the detection message 1 again, a response message carrying the MAC address A and the MAC address 402 is returned to the network device 401 since the MAC address A and the MAC address 402 are present. For convenience of description, a case where a response message carrying the MAC address A and the MAC address 402 is returned to the network device 401 is taken as an example in the following description.

After receiving a response message as to the detection message 1, the network device 401 parses out the MAC address A and the MAC address 402 from the response message. Since the system MAC address and an MAC address of another DR-member device are carried, it is determined that the network device 404 is not a device of a specified type for the network device 401.

Then, the network device 401 may send a specified message (such as an LLDP message or the like) to the network device 402, where the specified message carries information indicating that the network device 401 is connected with a device of an unspecified type. On this basis, after receiving the specified message, the network device 402 may know that the network device 401 is connected with a device of an unspecified type.

In one example, the information indicating that the network device 401 is connected with a device of an unspecified type may include the MAC address A and the MAC address 404, where the MAC address A is a system MAC address indicating that the network device 401 is connected with a device of an unspecified type, and the MAC address 404 indicates an MAC address of the device of an unspecified type to which the network device 401 is connected. Moreover, after receiving the specified message, the network device 402 may maintain a mapping table shown in Table 8. The opposite terminal (network device 401) of the interface 4022 is connected with a device of an unspecified type.

TABLE 8

| System MAC Address | Bridge MAC Address | Inbound Interface |
|---|---|---|
| 0 | MAC Address 405 | Interface 4022 |
| MAC Address A | MAC Address 404 | Interface 4022 |

It can be seen from Table 8 that the opposite terminal (network device 401) of the interface 4022 is connected with both a device of a specified type and a device of an unspecified type, thus it is considered that the network device 401 is connected to a device of a specified type.

After receiving a response message as to the detection message 2, the network device 402 parses out the MAC address A and the MAC address 401 from the response message. Since the system MAC address and an MAC address of another DR-member device are carried, it is determined that the network device 404 is not a device of a specified type for the network device 402.

Then, the network device 402 may send a specified message (such as an LLDP message or the like) to the network device 401, where the specified message carries information indicating that the network device 402 is connected with a device of an unspecified type. On this basis, after receiving the specified message, the network device 401 may know that the network device 402 is connected with a device of an unspecified type.

In one example, the information indicating that the network device 402 is connected with a device of an unspecified type may include the MAC address A and the MAC address 404, where the MAC address A is a system MAC address indicating that the network device 402 is connected with a device of an unspecified type, and the MAC address 404 indicates an MAC address of the device of an unspecified type to which the network device 402 is connected. Moreover, after receiving the specified message, the network device 401 may maintain a mapping table shown in Table 9. The opposite terminal (network device 402) of the interface 4012 is connected with a device of an unspecified type.

TABLE 9

| System MAC Address | Bridge MAC Address | Inbound Interface |
|---|---|---|
| MAC Address A | MAC Address 404 | Interface 4012 |

In a second case, it is assumed that the network device 404 first receives the detection message 2 and thereafter receives the detection message 1, then the implementation procedures performed by each network device are similar to those in the first case, and therefore will not be described repeatedly here.

Based on the two modes described above, the network device 401 determines that the network device 402 is not connected to a device of a specified type, while the network device 402 determines that the network device 401 is connected to a device of a specified type. On this basis, when the network device 402 is required to send a packet of a specified type, the network device sends the packet to the network device 1 through the interface 4022. When the network device 401 is required to send a packet of a specified type, the network device no longer sends the packet to the network device 402.

Figure 5:
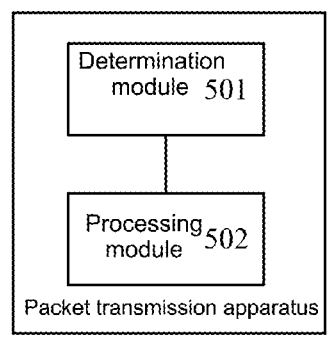
FIG. 5 is a structural diagram of a packet transmission apparatus in an embodiment of the present disclosure.

Based on the same concept as the method described above, an embodiment of the present disclosure also proposes a packet transmission apparatus, which may be applied to a local DR-member device. As shown in FIG. 5 which is a structural schematic diagram of the apparatus, the apparatus comprises:

a determination module 501 configured to determine whether an opposite DR-member device is connected to a first type of device, where the first type of device is a device connected to the opposite DR-member device but not connected to the local DR-member device; and a processing module 502 configured to send, when required to send a packet of a specified type, the packet to the opposite DR-member device if the opposite DR-member device is connected to the first type of device, and to prohibit sending the packet to the opposite DR-member device if the opposite DR-member device is not connected to the first type of device.

The determination module 501 is specifically configured to receive, during a process of determining whether the opposite DR-member device is connected to the first type of device, a first message sent by the opposite DR-member device, where the first message carries address information corresponding to a non-DR-member port of the opposite DR-member device in a forwarding table, and to query, from a local forwarding table, address information corresponding to a non-DR-member port of the local DR-member device, wherein if the queried address information does not include the address information carried by the first message, it is determined that the opposite DR-member device is connected to the first type of device; and if the queried address information has included the address information carried by the first message, it is determined that the opposite DR-member device is not connected to the first type of device.

The determination module 501 is specifically configured to receive, during a process of determining whether the opposite DR-member device is connected to the first type of device, a second message sent by the opposite DR-member device, where the second message carries connection information which is used to indicate that the opposite DR-member device is connected to the first type of device or is not connected to the first type of device, and to determine according to the second message whether the opposite DR-member device is connected to the first type of device.

In one example, the determination module 501 is further configured to determine whether the local DR-member device is connected to a second type of device, where the second type of device is a device connected to the local DR-member device but not connected to the opposite DR-member device. The processing module 502 is further configured to send a third message to the opposite DR-member device, where the third message carries connection information which is used to indicate that the local DR-member device is connected to the second type of device or is not connected to the second type of device, so that the opposite DR-member device determines according to the third message whether the local DR-member device is connected to the second type of device.

The determination module 501 is specifically configured to send, during a process of determining whether the local DR-member device is connected to the second type of device, a detection message to a non-DR-member device connected to the local DR-member device, the detection message carrying a system MAC address and a bridge MAC address of the local DR-member device, so that the non-DR-member device records the system MAC address and the bridge MAC address in a mapping table; to receive a response message which the non-DR-member device returns as to the detection message, wherein a system MAC address and a bridge MAC address of the opposite DR-member device are carried in the response message if the system MAC address and the bridge MAC address of the opposite DR-member device are recorded in the mapping table; and an MAC address of the non-DR-member device is carried in the response message if the system MAC address and the bridge MAC address of the opposite DR-member device are not recorded in the mapping table, wherein if the system MAC address and the bridge MAC address of the opposite DR-member device are parsed out from the response message, it is determined that the non-DR-member device is not a second type of device; and if the MAC address of the non-DR-member device is parsed out from the response message, it is determined that the non-DR-member device is a second type of device.

An embodiment of the present disclosure also proposes a computer-readable storage medium, which may be applied to a local DR-member device. The computer-readable storage medium comprises computer programs. During operation of the computer programs, the local DR-member device is controlled to execute the packet transmission method shown in FIG. 2.

Figure 6:
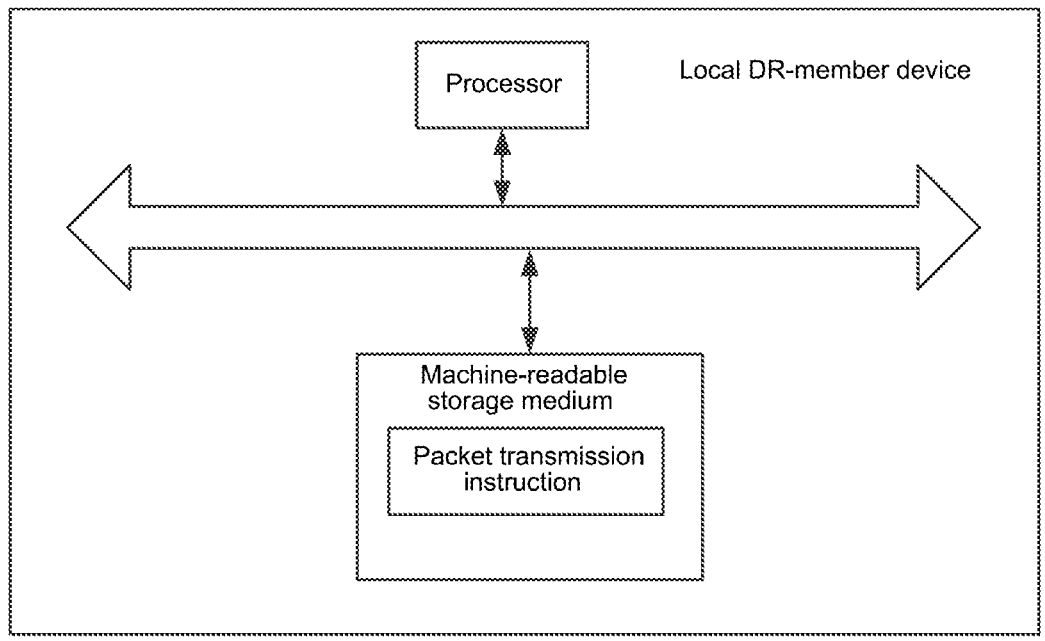
FIG. 6 is a hardware structural diagram of a DR-member device in an embodiment of the present disclosure.

For a local DR-member device provided in an embodiment of the present disclosure, a schematic diagram of the hardware architecture in terms of hardware level can be specifically seen and shown in FIG. 6. The local DR-member device comprises: a machine-readable storage medium and a processor, wherein the machine-readable storage medium is adapted to store instruction codes.

The processor is in communication with the machine-readable storage medium, and adapted to read and execute the instruction codes stored in the machine-readable storage medium, to implement the packet transmission operations disclosed in the aforesaid examples of the present disclosure.

Here, the machine-readable storage medium may be any electronic, magnetic, optical, or other physical storage device, and may contain or store information such as executable instructions, data, etc. For example, the machine-readable storage medium may be a RAM (Random Access Memory), a volatile memory, a non-volatile memory, a flash memory, a storage drive (such as a hard disk drive), a solid-state hard disk, any type of memory disk (such as an optical disk, DVD, or the like), or a similar storage medium, or a combination thereof.

Figure 7:
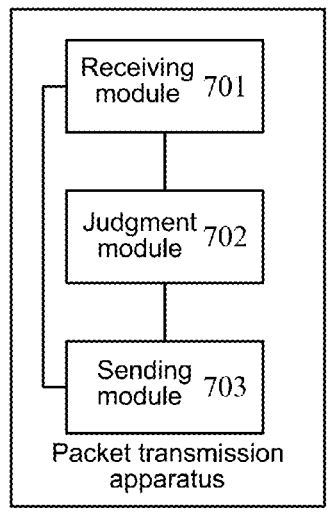
FIG. 7 is a structural diagram of a packet transmission apparatus in an embodiment of the present disclosure.

Based on the same concept as the method described above, an embodiment of the present disclosure also proposes a packet transmission apparatus, which may be applied to a non-DR-member device. As shown in FIG. 7 which is a structural schematic diagram of the apparatus, the apparatus comprises:

a receiving module 701 configured to receive a detection message sent by a DR-member device connected to the non-DR-member device, the detection message carrying a system MAC address and a bridge MAC address of the DR-member device, and to record a correspondence relationship between the system MAC address and the bridge MAC address in a mapping table;

a judgment module 702 configured to judge whether a system MAC address and a bridge MAC address of another DR-member device are present in the mapping table, wherein the system MAC address of the another DR-member device is the same as the system MAC address of the DR-member device, and the bridge MAC address of the another DR-member device is different from the bridge MAC address of the DR-member device; and a sending module 703 configured to return to the DR-member device a response message carrying the system MAC address and the bridge MAC address of the another DR-member device when the judgment result is yes, so that the DR-member device determines according to the response message that the non-DR-member device is not a device of a specified type; and to return to the DR-member device a response message carrying an MAC address of the non-DR-member device when the judgment result is no, so that the DR-member device determines according to the response message that the non-DR-member device is a device of a specified type.

An embodiment of the present disclosure also proposes a computer-readable storage medium, which may be applied to a non-DR-member device. The computer-readable storage medium comprises computer programs, wherein during operation of the computer programs, the non-DR-member device is controlled to execute the packet transmission method shown in FIG. 3.

Figure 8:
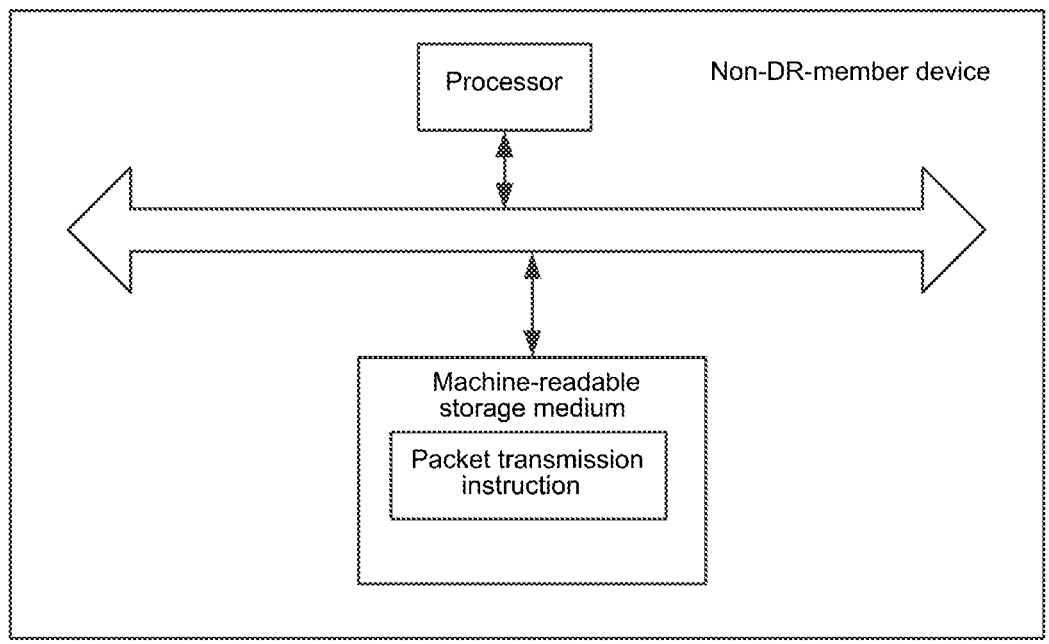
FIG. 8 is a hardware structural diagram of a non-DR-member device in an embodiment of the present disclosure.

For a non-DR-member device provided in an embodiment of the present disclosure, a schematic diagram of the hardware architecture in terms of hardware level can be specifically seen and shown in FIG. 8. The non-DR-member device comprises: a machine-readable storage medium and a processor, wherein the machine-readable storage medium is adapted to store instruction codes, and the processor is in communication with the machine-readable storage medium, and adapted to read and execute the instruction codes stored in the machine-readable storage medium, to implement the packet transmission operations disclosed in the aforesaid examples of the present disclosure.

Here, the machine-readable storage medium may be any electronic, magnetic, optical, or other physical storage device, and may contain or store information such as executable instructions, data, etc. For example, the machine-readable storage medium may be a RAM (Random Access Memory), a volatile memory, a non-volatile memory, a flash memory, a storage drive (such as a hard disk drive), a solid-state hard disk, any type of memory disk (such as an optical disk, DVD, or the like), or a similar storage medium, or a combination thereof.

The implementation principles and workflows for the packet transmission apparatus, the local DR-member device, the non-DR-member device, and the computer-readable storage medium provided in the embodiments of the present disclosure are similar to those in the foregoing packet transmission method. Reference can be made to the relevant description of the foregoing embodiment of the packet transmission method, and therefore a repeated description will be omitted here.

The system, apparatus, module or unit set forth in the above embodiments may be specifically implemented by a computer chip or an entity, or may be implemented by a product having a certain function. A typical implementation device is a computer. A specific form of the computer may be a personal computer, a laptop computer, a cellular phone, a camera phone, a smart phone, a personal digital assistant, a media player, a navigation device, an email sending and receiving device, a game console, a tablet computer, a wearable device, or a combination of several of these devices.

For convenience of description, the above apparatus is described by dividing the apparatus in accordance with the function into various units which are described respectively. Naturally, the functions of the individual units may be implemented in the same or multiple software and/or hardware during implementation of the present disclosure.

As will be appreciated by one skilled in the art, the embodiments of the present disclosure may provide a method, a system, or a computer program product. Accordingly, the present disclosure may take the form of an entirely hardware embodiment, an entirely software embodiment, or an embodiment combining software and hardware aspects. Furthermore, the embodiments of the present disclosure may take the form of a computer program product embodied on one or more computer-usable storage mediums (including, but not limited to, magnetic disk memories, CD-ROMs, optical memories, etc.) containing computer-usable program codes embodied therein.

The present disclosure is described with reference to flowcharts and/or block diagrams of methods, apparatuses (systems) and computer program products according to embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus, such that the functions specified in the flowchart flow or flows and/or block diagram block or blocks are implemented through the instructions executed by the processor of the computer or other programmable data processing apparatus.

Furthermore, these computer program instructions may also be stored in a computer-readable memory that can direct a computer or other programmable data processing apparatus to operate in a particular manner, such that the instructions stored in the computer-readable memory form instruction means which implement the functions specified in the flowchart flow or flows and/or block diagram block or blocks.

These computer program instructions may also be loaded onto a computer or other programmable data processing apparatus to cause a series of operations to be performed on the computer or other programmable apparatus to produce a computer implemented process such that the functions specified in the flowchart flow or flows and/or block diagram block or blocks are implemented through the instructions executed on the computer or other programmable apparatus.

As will be appreciated by one skilled in the art, the embodiments of the present disclosure may provide a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage mediums (which may include, but not limited to, magnetic disk memories, CD-ROMs, optical memories, etc.) containing computer-usable program codes embodied therein.

The above description is merely illustrative of the embodiments of the present disclosure and is not intended to limit the present disclosure. It would be understood by one skilled in the art that various modifications and variations can be made to the present disclosure. Any modifications, equivalent substitutions, improvements and so on made within the spirit and principle of the present disclosure should be included in the scope of the claims of the present disclosure.

INDUSTRIAL APPLICABILITY

The packet transmission method and apparatus provided in the embodiments of the present disclosure effectively avoid invalid transmission of packets, save IPL resources, reduce the burden on the IPL, and improve the stability of the IPL.

The invention claimed is:

1. A packet transmission method, applicable to a local DR-member device for distributed resilient network interconnect (DR), comprising:
   determining whether an opposite DR-member device is connected to a first type of device, wherein the first type of device is a device connected to the opposite DR-member device but not connected to the local DR-member device;
   when a packet of a specified type is required to be sent, when the opposite DR-member device is connected to the first type of device, sending the packet to the opposite DR-member device; and when the opposite DR-member device is not connected to the first type of device, prohibiting the packet from being sent to the opposite DR-member device;
   wherein the determining whether an opposite DR-member device is connected to a first type of device comprises:
      receiving a first message sent by the opposite DR-member device, wherein the first message carries address information corresponding to a non-DR-member port of the opposite DR-member device in a forwarding table; and querying, from a local forwarding table, address information corresponding to a non-DR-member port of the local DR-member device; and
      when the address information queried from the local forwarding table does not include the address information carried by the first message, determining that the opposite DR-member device is connected to the first type of device; and when the address information queried from the local forwarding table includes the address information carried by the first message, determining that the opposite DR-member device is not connected to the first type of device.

2. The method according to claim 1, wherein the determining whether an opposite DR-member device is connected to a first type of device comprises:
   receiving a second message sent by the opposite DR-member device, wherein the second message carries connection information indicating that the opposite DR-member device is connected to the first type of device or is not connected to the first type of device; and
   determining according to the second message whether the opposite DR-member device is connected to the first type of device.

3. The method according to claim 1, comprising:
   determining whether the local DR-member device is connected to a second type of device, wherein the second type of device is a device connected to the local DR-member device but not connected to the opposite DR-member device; and sending a third message to the opposite DR-member device, so that the opposite DR-member device determines according to the third message whether the local DR-member device is connected to the second type of device, wherein the third message carries connection information indicating that the local DR-member device is connected to the second type of device or is not connected to the second type of device;
   wherein the determining whether the local DR-member device is connected to a second type of device comprises:
      sending, to a non-DR-member device connected to the local DR-member device, a detection message carrying a system MAC address and a bridge MAC address of the local DR-member device, so that the non-DR-member device records the system MAC address and the bridge MAC address in a mapping table;
      receiving a response message returned by the non-DR-member device for the detection message, wherein when a system MAC address and a bridge MAC address of the opposite DR-member device are recorded in the mapping table, the system MAC address and the bridge MAC address of the opposite DR-member device are carried in the response message; and when the system MAC address and the bridge MAC address of the opposite DR-member device are not recorded in the mapping table, an MAC address of the non-DR-member device is carried in the response message; and
      when the system MAC address and the bridge MAC address of the opposite DR-member device are obtained by parsing the response message, determining that the non-DR-member device is not the second type of device; and when the MAC address of the non-DR-member device is obtained by parsing the response message, determining that the non-DR-member device is the second type of device.

4. The method according to claim 3, wherein the sending a detection message to a non-DR-member device connected to the local DR-member device comprises:
   periodically sending the detection message to the non-DR-member device connected to the local DR-member device at a set time interval; or
   periodically sending the detection message to the non-DR-member device connected to the local DR-member device through a non-DR-member port at a set time interval.

5. A packet transmission method, applicable to a non-DR-member device for distributed resilient network interconnect (DR), comprising:
   receiving a detection message sent by a DR-member device connected to the non-DR-member device, wherein the detection message carries a system MAC address and a bridge MAC address of the DR-member device; and recording a correspondence relationship between the system MAC address and the bridge MAC address in a mapping table;
   judging whether a system MAC address and a bridge MAC address of another DR-member device are present in the mapping table;
   when the system MAC address and the bridge MAC address of the other DR-member device are present in the mapping table, returning a response message carrying the system MAC address and the bridge MAC address of the other DR-member device to the DR-member device, so that the DR-member device determines according to the response message that the non-DR-member device is not a specified type of device; and when the system MAC address and the bridge MAC address of the other DR-member device are not present in the mapping table, returning a response message carrying an MAC address of the non-DR-member device to the DR-member device, so that the DR-member device determines according to the response message that the non-DR-member device is a specified type of device.

6. The method according to claim 5, wherein the system MAC address of the other DR-member device is same as the system MAC address of the DR-member device, and the bridge MAC address of the other DR-member device is different from the bridge MAC address of the DR-member device.

7. The method according to claim 6, wherein the judging whether a system MAC address and a bridge MAC address of another DR-member device are present in the mapping table comprises:

judging whether the mapping table contains a table entry having a system MAC address that is same as the system MAC address of the DR-member device and a bridge MAC address that is different from the bridge MAC address of the DR-member device; when the mapping table contains the table entry, determining that the system MAC address and the bridge MAC address of the other DR-member device are present in the mapping table; and when the mapping table does not contain the table entry, determining that the system MAC address and the bridge MAC address of the other DR-member device are not present in the mapping table.

8. A packet transmission apparatus, wherein the packet transmission apparatus is applied to a local DR-member device for distributed resilient network interconnect (DR), and the packet transmission apparatus comprises:

a processor configured to:
determine whether an opposite DR-member device is connected to a first type of device, wherein the first type of device is a device connected to the opposite DR-member device but not connected to the local DR-member device; and
when a packet of a specified type is required to be sent, send the packet to the opposite DR-member device when the opposite DR-member device is connected to the first type of device, and prohibiting sending of the packet to the opposite DR-member device when the opposite DR-member device is not connected to the first type of device;
wherein the processor is to, in determining whether the opposite DR-member device is connected to the first type of device, receive a first message sent by the opposite DR-member device, wherein the first message carries address information corresponding to a non-DR-member port of the opposite DR-member device in a forwarding table; and query, from a local forwarding table, address information corresponding to a non-DR-member port of the local DR-member device;
when the queried address information does not include the address information carried by the first message, determine that the opposite DR-member device is connected to the first type of device; and when the queried address information includes the address information carried by the first message, determine that the opposite DR-member device is not connected to the first type of device.

9. The apparatus according to claim 8, wherein the processor is to, in determining whether the opposite DR-member device is connected to the first type of device, receive a second message sent by the opposite DR-member device; and determine according to the second message whether the opposite DR-member device is connected to the first type of device, wherein the second message carries connection information indicating that the opposite DR-member device is connected to the first type of device or is not connected to the first type of device.

10. The apparatus according to claim 8, wherein the processor is configured to further determine whether the local DR-member device is connected to a second type of device, wherein the second type of device is a device connected to the local DR-member device but not connected to the opposite DR-member device; and the processor is further configured to send a third message to the opposite DR-member device, so that the opposite DR-member device determines according to the third message whether the local DR-member device is connected to the second type of device, wherein the third message carries connection information indicating that the local DR-member device is connected to the second type of device or is not connected to the second type of device.

11. The apparatus according to claim 10, wherein the processor is to, in determining whether the local DR-member device is connected to the second type of device, send to a non-DR-member device connected to the local DR-member device, a detection message carrying a system MAC address and a bridge MAC address of the local DR-member device, so that the non-DR-member device records the system MAC address and the bridge MAC address in a mapping table; and receive a response message returned by the non-DR-member device for the detection message, wherein when a system MAC address and a bridge MAC address of the opposite DR-member device are recorded in the mapping table, the system MAC address and the bridge MAC address of the opposite DR-member device are carried in the response message; and when the system MAC address and the bridge MAC address of the opposite DR-member device are not recorded in the mapping table, an MAC address of the non-DR-member device is carried in the response message;

when the system MAC address and the bridge MAC address of the opposite DR-member device are obtained by parsing the response message, determine that the non-DR-member device is not the second type of device; and when the MAC address of the non-DR-member device is obtained by parsing the response message, determine that the non-DR-member device is the second type of device.

12. The apparatus according to claim 11, wherein the processor is to, in sending a detection message to a non-DR-member device connected to the local DR-member device, periodically send the detection message to the non-DR-member device connected to the local DR-member device at a set time interval; or periodically send the detection message to the non-DR-member device connected to the local DR-member device through a non-DR-member port at a set time interval.

\* \* \* \* \*